(12) United States Patent
Matics

(10) Patent No.: US 8,049,876 B2
(45) Date of Patent: Nov. 1, 2011

(54) ALIGNMENT TECHNIQUE

(75) Inventor: Scott Raymond Matics, Jacksonville, FL (US)

(73) Assignee: GVBB Holdings S.A.R.L., Luxembourg (LU)

( * ) Notice: Subject to any disclaimer, the term of this patent is extended or adjusted under 35 U.S.C. 154(b) by 1 day.

(21) Appl. No.: 12/449,859

(22) PCT Filed: Mar. 1, 2007

(86) PCT No.: PCT/US2007/005338
§ 371 (c)(1),
(2), (4) Date: Aug. 31, 2009

(87) PCT Pub. No.: WO2008/105765
PCT Pub. Date: Sep. 4, 2008

(65) Prior Publication Data
US 2010/0033713 A1    Feb. 11, 2010

(51) Int. Cl.
*G01B 11/27* (2006.01)
(52) U.S. Cl. .................. 356/139.06; 356/153
(58) Field of Classification Search ............ 356/139.04, 356/139.06, 141.1, 141.4, 141.5, 153
See application file for complete search history.

(56) References Cited

U.S. PATENT DOCUMENTS

| 4,684,247 | A | 8/1987 | Hammill, III |
| 4,684,248 | A | 8/1987 | Cinzori |
| 6,023,337 | A | 2/2000 | Schiff |
| 6,462,810 | B1 * | 10/2002 | Muraoka et al. ......... 356/139.04 |
| 7,486,390 | B2 | 2/2009 | Suing et al. |
| 7,558,688 | B2 * | 7/2009 | Schering et al. ............. 702/92 |
| 2006/0196060 | A1 * | 9/2006 | Suing et al. ................... 33/286 |

FOREIGN PATENT DOCUMENTS

| DE | 102006012633 | 9/2006 |
| EP | 0168664 | 1/1986 |
| GB | 2237380 | 5/1991 |
| GB | 2275543 | 8/1994 |
| JP | 2000267021 | 9/2000 |

OTHER PUBLICATIONS

International Search Report, dated Nov. 9, 2007.

* cited by examiner

*Primary Examiner* — Isam Alsomiri
(74) *Attorney, Agent, or Firm* — Arent Fox LLP

(57) ABSTRACT

An object, such as a robotically controlled television camera undergoes alignment with a reflective target by directing a coherent beam of radiation, e.g., a laser beam, into an opening in an enclosure having a reflective interior such that the radiation strikes a reflector in axial alignment with the enclosure opening. Upon striking the target, the beam undergoes reflection through the enclosure opening back to the object for detection. Alignment between the object and the target occurs when substantially all of the radiation undergoes reflection from the target to the object.

19 Claims, 3 Drawing Sheets

ALIGNMENT TECHNIQUE

This application claims the benefit, under 35 U.S.C. §365 of International Application PCT/US2007/005338, filed Mar. 1, 2007, which was published in accordance with PCT Article 21(2) on Sep. 4, 2008 in English.

TECHNICAL FIELD

This invention relates to a technique for aligning an object, such as a robotic television camera, in several dimensions.

BACKGROUND ART

In many applications, a need exists to establish alignment of an object with a target. For example within a television studio, movement of a tripod or pedestal associated with a television camera to an alternate locations often occurs to better leverage the investment in such equipment. However, a change in the positioning of the tripod or pedestal with respect to the set often results a change in the camera position. As a consequence, the new position of the camera will likely differ by several centimeters, or even several meters from its previous position (referred to as a "preset"). In the case of a robotically operated camera, no mechanism typically exists for easily accomplishing re-alignment. Rather, the camera must undergo manual re-alignment and followed by time consuming re-programming of the location presets.

Thus a need exists for a technique for simply and efficiently aligning a television camera.

BRIEF SUMMARY OF THE INVENTION

Briefly, in accordance with a preferred embodiment of the present principles, there is provided a method for aligning an object, such as but not limited to, a robotically controlled television camera, with a target. The method commences by directing a coherent beam of radiation, e.g., a laser beam, into an opening in an enclosure having a reflective interior such that the radiation strikes the target which lies in axial alignment with the enclosure opening. Upon striking the target, the beam undergoes reflection through the enclosure opening back to the object for detection. Alignment between the object and the target occurs when substantially all of the radiation undergoes reflection from the target to the object.

DETAILED DESCRIPTION

Figure 1:
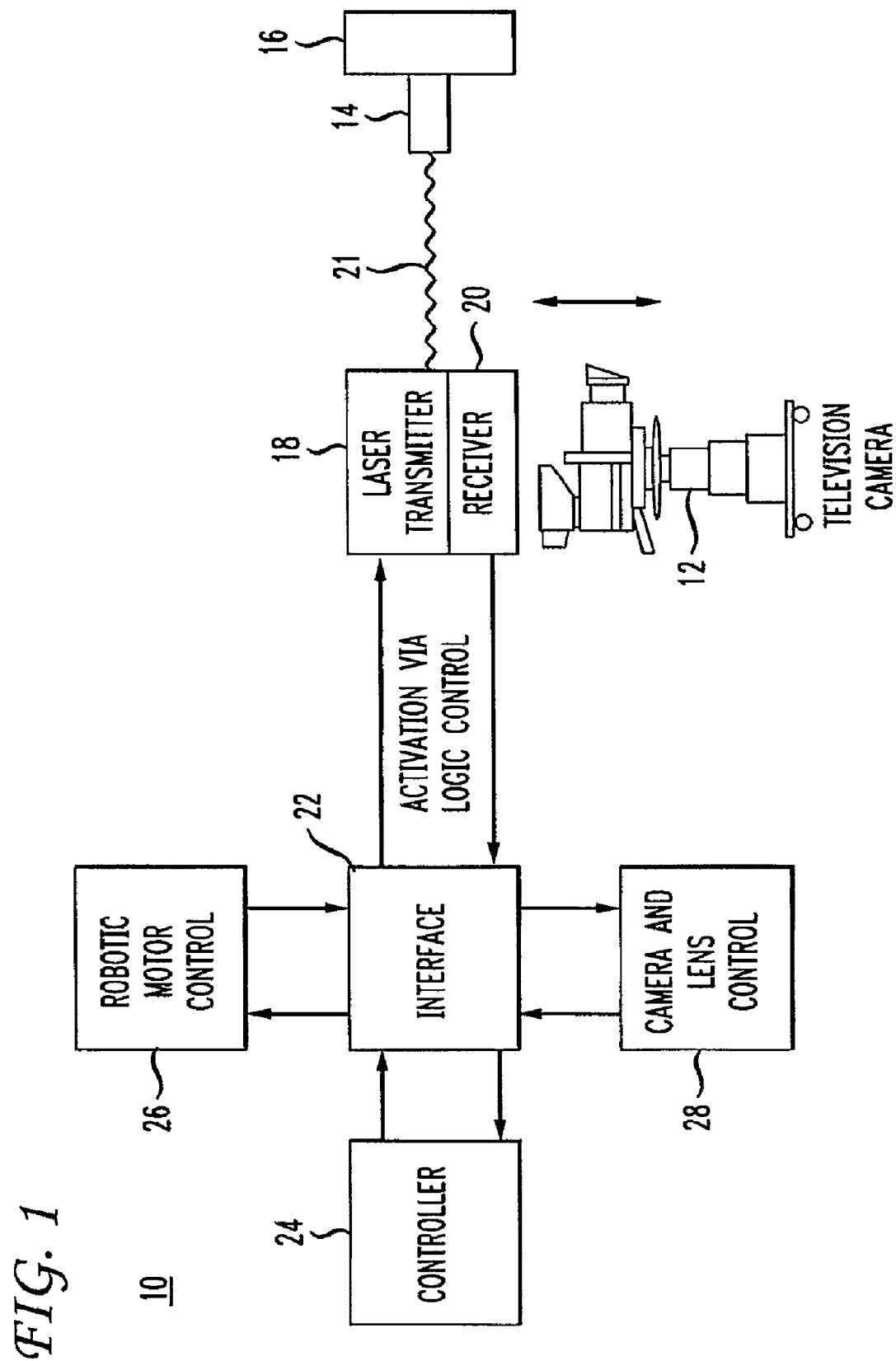
FIG. 1 depicts a block schematic diagram of a system, in accordance with a preferred embodiment of the present principles, for aligning a robotically controlled camera with a target.

FIG. 1 depicts a block schematic of a system 10 in accordance with a preferred embodiment of the present principles for aligning an object, illustratively depicted as a television camera 12, with a fixed target 14, illustratively attached to a solid surface 16, such as a wall. The alignment system 10 of the present principles includes the combination of a radiation source 18, and a receiver 20. In practice, the radiation source 18 comprises a laser for generating a beam 21 of coherent radiation (e.g., light) having a relatively small cross section. Typically, the receiver 20 comprises a photo detector, a photo diode or the like, in combination with a beam splitter (not shown), for detecting the radiation reflected from the target 14 along a path coaxial with the incident beam 21. The radiation source 18 and the receiver 20 are both mounted to the camera 12 such that when the camera becomes aligned with the target 14 in the manner described hereinafter, the receiver will detect the beam 21 with little if any scattering.

An interface 22 links both the radiation source 18 and the receiver 20 to a controller 24 that typically includes a programmed computer or the like (not shown). The interface 22 also links the controller 24 to a robotic motor control unit 26 that includes one or more motors (not shown) that serve to pan and tilt the camera 12, thereby displacing the camera along the X and Y axes, respectively, which lie in a plane normal to axis of the beam 21 as seen in FIG. 1. In practice, the robotic motor controller 26 can also control a motorized pedestal (not shown) which serves to raise and lower the camera 12. In addition, the controller 24 controls a camera lens control 28 coupled to the interface 22. The camera lens control 28 includes one or more motors (not shown) that serve to adjust various functions of a camera lens (not shown), such as but not limited to, zoom, focus and iris.

Figure 2:
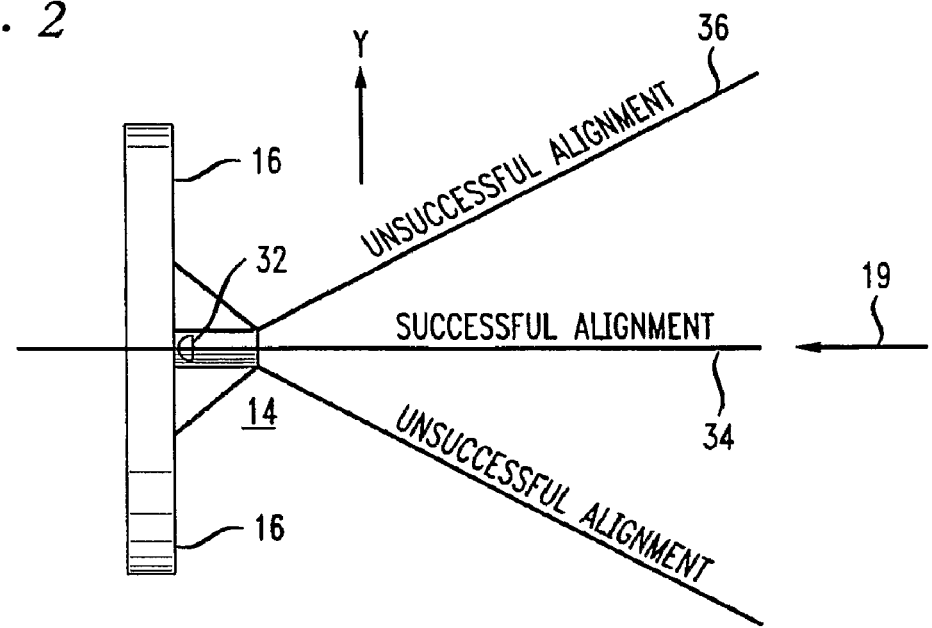
FIGS. 2 and 3 depict front and side views, respectively, of the target of FIG. 1.
Figure 3:
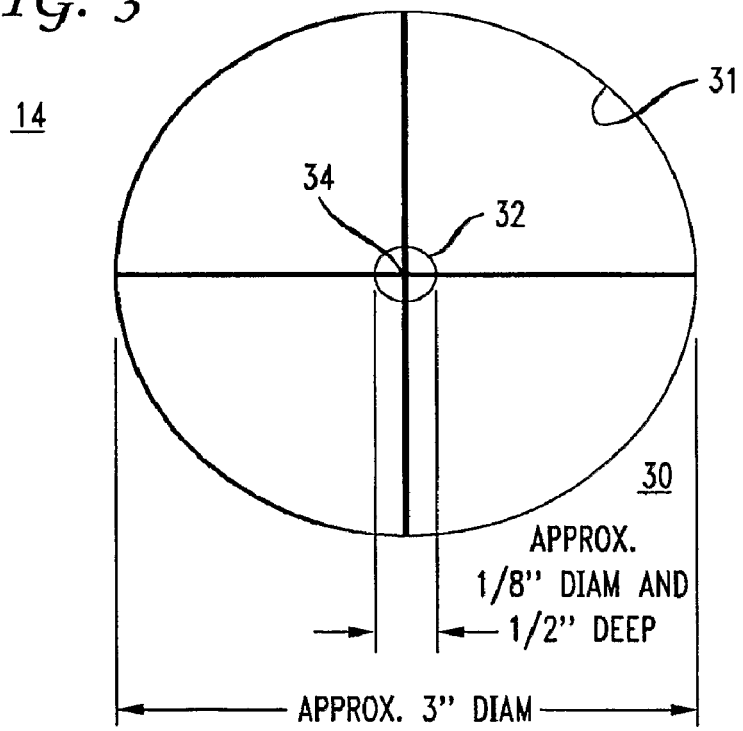

FIGS. 2 and 3 depict front and side views, respectively, of the target 14 associated with which is a hollow enclosure 30, typically although not necessarily a tube, having a reflective surface. Referring to FIG. 3, the wall 16 supports the enclosure 30 of FIG. 2 by way of a mounting mechanism (not shown) so that the enclosure has its central axis 34 normal to the wall. As best seen in FIG. 2, the enclosure 30 has an opening 31 through which a beam of radiation, such as beam 21 of FIG. 1, can enter. In practice, the target takes the form a reflector 32, typically in the form of a circular mirror or the like, lies at the center of the enclosure opening 31 such that the central enclosure axis 34 lies coaxial with an axis normal to, and extending from the center of the reflector. Typically, the reflector 32 has a relatively small diameter (e.g., 0.1275 inches) as compared to the diameter of the enclosure opening 31 (e.g., 3 inches).

The reflector 32 has its center at a fixed position in both along both the X and Y axes (typically 0, 0) known to the controller 24 of FIG. 1. Alignment of the camera 12 of FIG. 1 with the target 14 will occur upon positioning of the camera such that the axis of the beam 21 of FIG. 1 lies substantially coaxial with the central enclosure axis 34, as determined by nearly complete reflection of the beam by the reflector 32 back to the camera with nearly no scattering. To better understand the alignment of the camera 12 in this manner, refer to FIG. 3. For purposes of discussion, assume that the camera 12 has a pedestal height such that the beam 21 can strike the reflector 32 when precisely aligned in X and Y. As seen in FIG. 3, a misalignment of the beam 21 along the Y axis will result in reflection of the beam along one of axes 36 or 38, respectively, depending on whether the camera is tilted high or low, respectively. Indeed, the camera misalignment of the camera 12 depicted in FIG. 3 is sufficiently great so that the beam 21 fails to enter the enclosure opening 31.

The alignment technique of the present principles can even detect a small misalignment between the camera 12 and the target 14. Consider the circumstance when the camera 12 is roughly aligned with the target 14 to the degree that the beam 21 enters the enclosure opening 31 and even strikes the reflector 32. However, presume that sufficient misalignment exists so that the beam 21 does not lie coaxial with the enclosure axis 34. Under such circumstances, the reflector 32 will reflect the beam 21 off axis so that beam strikes the reflective interior surface of the enclosure 30. Thus, the beam 21 will undergo scattering so that little if any portion of the beam will strike the receiver 20. Thus, only when the camera 12 and target 14 are aligned such that the beam 21 enters the enclosure 30 and strikes the reflector 32 for reflection coaxial with the central enclosure axis 34 will the receiver 20 of FIG. 1 detect the beam with little if any scattering. Providing the beam 21 with the relatively narrow cross section and marking the reflector 32 relatively small in diameter increases the precision of the alignment technique of the present principles.

As described with respect to FIG. 3, the enclosure 30 is mounted to the support structure 16 to circumscribe the reflector 32. However, the enclosure 30 could be mounted to the camera 12 to circumscribe the beam 21.

Figure 4:
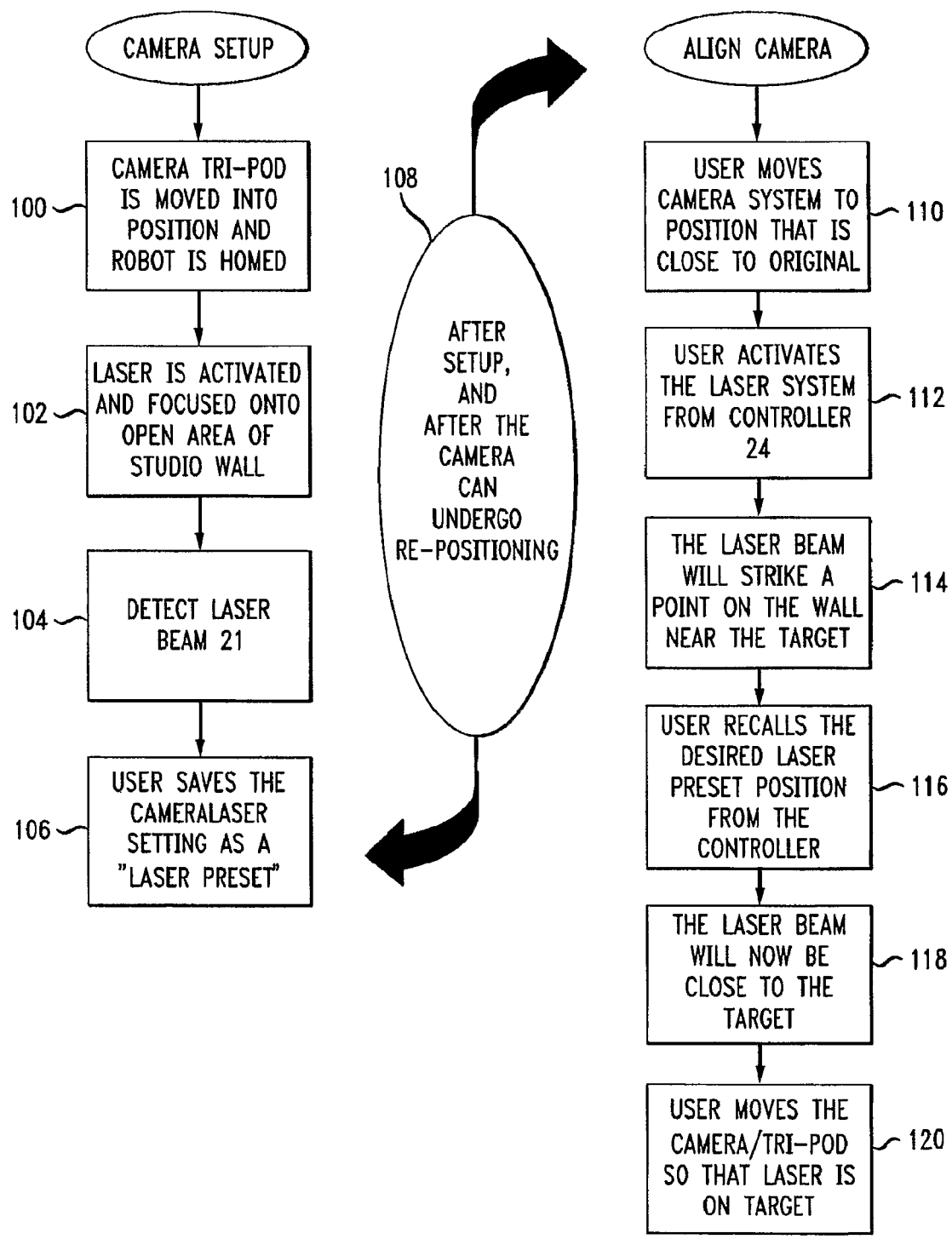
FIG. 4 depicts a flow chart illustrating the steps of a method for aligning the robotically controlled camera with the target, both of FIG. 1.

FIG. 4 depicts a flow chart showing the steps associated with camera set-up and camera alignment. Camera set-up commences by moving the camera 12 of FIG. 1 and its associated tripod or pedestal (not shown) to a given position (step 100). Thereafter, the laser 18 of FIG. 1 undergoes activation (step 102) to generate the beam 21 directed towards the target 14. Assuming the camera 12 and the target 12 are aligned such that the laser beam 21 of FIG. 1 will enter the enclosure 30 and undergo reflection by the reflector 32 with substantially no scattering, the receiver 20 of FIG. 1 will detect the reflected beam during step 104 of FIG. 3. Using the controller 24 of FIG. 1, the user saves the camera 12/laser 18 position as a "laser preset."

After initial alignment as described, the camera 12 and its tripod or pedestal can undergo repositioning during step 108, thus prompting the need for alignment. Camera alignment commences by re-positioning the camera 12 during step 110 to a position close to its original X and Y position as in step 100. Thereafter, the user activates the laser 18 of FIG. 1 through the controller 24 of FIG. 1, during step 112 of FIG. 4 to generate the beam 21 of FIG. 1. Assuming that the user did not perfectly align the camera 12 with the target 14 during step 110, then the beam 21 will likely strike the support surface 16 (i.e., the wall) at a point outside of the enclosure opening 31 of FIG. 1. Thereafter, the user will recall the desired camera (and hence, laser) position during step 116 that was previously saved as a preset during step 106. Assuming that the user positioned the camera during step 110 to a position reasonably close to the original position, then the recalling the preset position during step 116 will cause the beam 21 to enter the enclosure opening 31 to strike close to the target 14 during step 118. Thereafter, the user will displace the camera 12, either though manual movement or through slight jogs using the controller 24, or a combination thereof, to precisely align the camera with the target, as signified by the reception of the reflected beam by the receiver 20.

The foregoing describes a technique for aligning an object with a target.

The invention claimed is:

1. A method for axially aligning a repositioned camera, comprising the steps of:
   providing a camera with a radiation source and a receiver;
   establishing a preset based upon a first position of the camera;
   moving the camera to a second position;
   directing a beam of coherent radiation from the camera through an opening in an enclosure having a radiation-reflective interior to strike a reflective target in axial alignment with the enclosure opening;
   detecting at the receiver radiation reflected back from the target;
   recalling the established preset;
   adjusting the camera position based upon the recalled preset; and
   precisely aligning the camera by establishing axial alignment between the camera and the target when substantially all of the radiation is reflected from the target to the object.

2. The method according to claim 1 wherein the step of directing the coherent beam of radiation comprises the step of:
   generating a laser beam at the camera; and
   directing the laser through the enclosure opening.

3. The method according to claim 1 wherein the step of directing the coherent radiation beam comprises the steps of:
   initially homing the object with the target;
   aligning the object with the target;
   establishing an object preset position when the object and target are aligned;
   following movement of the object from the preset position, returning the object to a position substantially close to the preset position; and
   activating a source of coherent radiation to generate a beam for direction through the enclosure opening.

4. The method according to claim 1 wherein the step of establishing axial alignment includes the step of manually displacing the camera relative to the target.

5. The method according to claim 1 wherein the step of establishing axial alignment comprises the step of actuating a robotic control system to jog the camera relative to the target.

6. The method according to claim 1, wherein the radiation-reflective interior comprises a mirror.

7. The method according to claim 6, wherein the mirror is a circular mirror having a relatively small diameter compared to a diameter of the enclosure.

8. The method according to claim 7, wherein the diameter of the mirror is less than one half inch and the diameter of the enclosure is more than two inches.

9. A method for axially aligning a repositioned camera, comprising the steps of:
   providing a camera with a radiation source and a receiver;
   establishing a preset based upon a first position of the camera;
   moving the camera to a second position;
   directing a beam of coherent radiation outwardly from said camera toward said target;
   recalling the established preset;
   adjusting the camera position based upon the recalled preset;
   precisely aligning the camera by defining an alignment axis with said beam;
   defining a boundary for a volume of space surrounding said axis for receiving an inwardly directed beam of radiation reflected from said target;
   when said inwardly directed beam enters said volume of space and impinges said boundary, directing said inwardly directed beam out of said volume of space; and
   adjusting said axis to prevent said inwardly directed beam from impinging said boundary.

10. A system for aligning a repositioned camera, comprising:
   a hollow enclosure having an opening positioned in axial alignment with a reflective target, the enclosure having a reflective interior for scattering radiation directed into enclosure opening not axially aligned with the target;
   interface means for establishing a preset based upon a first position of the camera, wherein the interface means are further configured to recall the established present after the camera has been adjusted to a second position;

means for directing an incident coherent beam of radiation into the enclosure opening for reflection from the target along a path coaxial with the beam with substantially no scattering when the object is axially aligned with the target; and detecting means positioned in axial alignment with the target for detecting the coherent beam of radiation reflected from the target through the enclosure opening along the path coaxial with the incident beam.

11. The apparatus according to claim 10 wherein the mean for generating a coherent beam of radiation comprises a laser.

12. The apparatus according to claim 10 wherein the detecting means comprises one of a photo detector or photo diode.

13. The system of claim 10, further comprising:
a controller for controlling the camera.

14. The system of claim 13, further comprising:
motor control means for robotically performing at least one of panning and tilting the camera, wherein the controller is linked to the motor control means.

15. The system of claim 14, wherein the motor control means is further configured to raise and lower the camera.

16. The system according to claim 14, wherein the controller is further configured to adjust the functions of a camera lens of the camera.

17. The system according to claim 7, wherein the reflective target comprises a mirror.

18. The system according to claim 17, wherein the mirror is a circular mirror having a relatively small diameter compared to a diameter of the enclosure.

19. The system according to claim 18, wherein the diameter of the mirror is less than one half inch and the diameter of the enclosure is more than two inches.

* * * * *